United States Patent [19]

Watts, Jr. et al.

[11] 4,124,758
[45] Nov. 7, 1978

[54] AMINATED HYDROXYALKYL CELLULOSE

[75] Inventors: Lewis W. Watts, Jr.; Ernest L. Yeakey, both of Austin, Tex.

[73] Assignee: Texaco Development Corporation, New York, N.Y.

[21] Appl. No.: 828,800

[22] Filed: Aug. 29, 1977

[51] Int. Cl.$^2$ .............................................. C08B 11/00
[52] U.S. Cl. ........................................ 536/43; 536/30
[58] Field of Search ................................... 536/30, 43

[56] References Cited

U.S. PATENT DOCUMENTS

| 2,136,296 | 11/1938 | Hardy | 536/43 |
| 3,152,998 | 10/1964 | Moss | 252/474 |

*Primary Examiner*—Melvyn I. Marquis
*Attorney, Agent, or Firm*—Carl G. Ries; Thomas H. Whaley; James L. Bailey

[57] ABSTRACT

Covers aminated cellulose derivatives prepared by the reductive amination of a hydroxyalkyl cellulose.

6 Claims, No Drawings

AMINATED HYDROXYALKYL CELLULOSE

BACKGROUND OF THE INVENTION

1. Field of the Invention

This invention is concerned with amino cellulose derivatives useful as water treatment chemicals and the like. The present invention is also concerned with a process of preparing said amino cellulose compositions.

2. Description of the Prior Art

The art is replete with various classes of polymers containing amine functions and their method of preparation. However, there is an ever increasing need for compositions of this type, particularly those which may be prepared from relatively inexpensive natural products such as cellulose and the like. It is therefore an object of the invention to provide a new class of amine compositions derived from cellulose which may be useful for a variety of diverse end-utilities.

SUMMARY OF THE INVENTION

In accordance with the present invention we have discovered an aminated cellulose derivative which is prepared by the reductive amination of a hydroxyalkyl cellulose. The process of preparing said derivative includes the steps of providing a hydroxyalkyl cellulose and reductively aminating said hydroxyalkyl cellulose with ammonia, ammonium hydroxide or an alkyl amine in the presence of a reducing catalyst to yield said aminated derivative.

DESCRIPTION OF THE PREFERRED EMBODIMENTS

The first step of the invention involves providing a hydroxyalkyl cellulose. Such materials are well known and need little elaboration. The alkyl group may range from 2–18 carbon atoms, and preferably ranges from 2 to 4 carbon atoms. Most preferably the alkyl group is ethyl or propyl. Such materials are usually prepared by reacting an alkali treated cellulose with an alkylene oxide such as ethylene oxide or propylene oxide. The alkoxylation reaction can be conducted using conventional methods and conditions such as temperatures in the range of about 40° C. to about 200° C. and pressures from about 0 to about 100 psig. The reaction may take place utilizing cellulose or an alkali metal cellulose, and is usually established under basic conditions through the use of alkali metals, their hydroxides, oxides or in some cases basic amines. Representative alkoxylation procedures which may be followed here are described in the following reference: Martin J. Schick, Ed. "Nonionic Surfactants", Marcel Dekker Inc., New York, N.Y. 1967, pp. 187-204.

The hydroxyalkyl cellulose starting materials normally have a D.S. ranging from about 0.5 to about 3. By D.S. is meant the "degree of substitution" which is defined as the average number of hydroxy groups substituted per anhydroglucose unit. The maximum number of hydroxy groups per anhydroglucose is three and therefore the theoretical maximum degree of substitution is also three in the case of monofunctional substituents.

In the case of polymerizable substitutents such as oxides that can react not only with the hydroxy groups but also with themselves, the number of substitutents is no longer limited by the three available hydroxy groups on the anhydroglucose unit. The term "degree of mole substitution", (M.S.) is adopted and defined simply as the number of moles of substituent per anhydroglucose unit. There is no theoretical maximum value for the degree of molar substitution, (M.S.). Usually the starting the hydroxy alkyl cellulose materials here have an M.S. ranging from about 2 to about 4.

The most preferred starting materials are hydroxy propyl cellulose compositions such as those in powder form which may vary in molecular weight from around 60,000 to about 300,000, and possess a M.S. of about three. Such materials exhibit solubility in cold water but not in hot water, and contain total acetylatables ranging from about 6 to about 8 meq/g.

The hydroxyalkyl cellulose is then reacted with ammonia or ammonium hydroxide or an alkyl or dialkyl amine in the presence of a suitable reductive amination catalyst to produce the desired cellulose amine. By the term "alkyl amine" is meant to include both monoalkyl and dialkyl amines. A wide number of known catalysts of this type are useful here. Preferred are nickel and cobalt-based catalyst, including Raney nickel and nickel in combination with other metals or oxides of metals.

The hydroxyalkyl cellulose compositions are preferably reacted with ammonia or ammonium hydroxide (most preferably ammonia) in the presence of said hydrogenation-dehydrogenation catalyst at elevated temperatures in the presence of hydrogen to form the cellulose amines of the invention. Suitable reactors include either a closed autoclave resulting in a batch process or a tubular reactor which can be operated in a continuous manner. Either is suitable for the practice of this invention.

As just noted the class of useful catalysts here is well known and may include one or more of the metals including copper, nickel, cobalt, chromium, aluminum, manganese, platinum, palladium and rhodium and the oxides of these metals. The metals or their oxides may be employed in combination with normally nonreducible metal oxides such as chromium oxide, molybdenum oxide and manganese oxide. The amount of the nonreducible oxide employed may be varied considerably and some catalysts, notably those based upon cobalt require the presence of no nonreducible metal oxides.

One preferred catalyst that is very effective for the amination reaction, includes the metals or oxides of nickel, cobalt and chromium. A particularly satisfactory catalyst is one in which the active ingredients consist essentially, in mole percentages on an oxide-free basis of 60–85 percent nickel, 14–37 percent copper and 1–5 percent chromium as produced in accordance with procedures described in U.S. Pat. No. 3,152,998. As used herein this catalyst will be referred to as a nickel-copper-chromium catalyst.

The reductive amination reaction is carried out from 160° C. to 250° C. The reaction pressures are from 750 to about 4000 psig with a hydrogen partial pressure of at least 200 psig. The preferred pressure range is from about 1000 to about 2500 psig and a hydrogen partial pressure from about 200 to about 2000 psig.

The residence time in the reactor to be used to produce the amine polymers of the invention are those which would occur at space velocities of about 0.2 to about 3.0 volume of reactants per volume of catalyst per hour, with the preferred space velocity being from about 1.0 to about 2.0. The space velocity herein described is in cm$^3$/volume of catalyst (cm$^3$)/hour, but rates in equivalent units are equally applicable.

The ratio of reactants, i.e., the hydroxyalkyl cellulose and the ammonia can vary over a wide range to produce the amine polymers of the invention. The feed rate of the hydroxyalkyl cellulose expressed here in terms of weight per hour, can vary from about one times the ammonia feed rate to from about 0.2 times the ammonia feed rate.

When an alkyl or dialkyl amine is utilized as reactant normally the alkyl group ranges from about 1–4 carbon atoms. Typical reactants of this type include methyl amine, ethyl amine, propyl amine, dimethyl amine, diethyl amine, butyl amine, etc.

By following the above-discussed techniques of the invention a relatively high percentage of the hydroxy groups of the hydroxy alkyl cellulose are transformed into primary amine groups. The aminated hydroxyalkyl cellulose materials usually have a nitrogen content ranging from about 0.05% to about 10% or more, usually in the form of primary amine groups.

The aminated hydroxyalkyl cellulose materials may be used for a variety of end-uses. For example, such utility may be as flocculents, as pigmentation aids in paper-making, as antistatic agents for fibers and fabrics, as hand stiffeners for fabrics, in cosmetic formulations, in adhesives, in printing inks, and so forth.

The above-described invention is more particularly set forth in the following Examples which are to be construed for purposes of illustration only and not for limitation of the invention. Obvious modifications of the following examples can be made.

EXAMPLE I 100 grams of a hydroxypropyl cellulose of relatively low molecular weight having total acetylatables of 6.9 meq/gm was charged to an autoclave along with 250 grams of a 28% concentration ammonium hydroxide and 100 grams of catalyst. The catalyst was a pre-reduced nickel-copper-chromium catalyst containing 75 mole percent nickel, 23 mole percent copper and 2 mole percent chromium.

The autoclave was pressured to about 500 psig with hydrogen at room temperature, and then heated at 214°–217° C. for 4 hours during which time the pressure was maintained at approximately 2725 psig via hydrogen addition.

The resulting product was filtered, subjected to stripping in vacuo and analyzed. The dark solid material had a nitrogen content of 6.4 weight percent.

EXAMPLE II

Here a hydroxypropyl cellulose having a molecular weight of about 60,000, and total acetylatables of 7.4 meq/gm was charged to an autoclave in an amount of 100 grams. Also charged to the autoclave was 250 grams of a 28% ammonium hydroxide and 100 grams of the catalyst of Example I. The autoclave was pressured to about 500 psig with hydrogen, and the resulting mixture heated at 208°–217° C. for 4 hours at a maximum pressure at about 2500 psig maintained by addition of hydrogen.

Filtration followed by removal of low boiling components under reduced pressure provided a black semi-solid exhibiting the following analysis: total acetylatables-7.2 meq/gm; total amines-1 meq/gm; and primary amine content-1 meq/gm.

The invention is hereby claimed as follows:

We claim:

1. An aminated cellulose derivative prepared by the reductive amination of a hydroxyalkyl cellulose by reaction with ammonia or ammonium hydroxide or an alkyl amine at 160° C. to 250° C. and under 750–4000 psig pressure in presence of hydrogen and a reducing catalyst comprising a metal selected from the group consisting of copper, nickel, cobalt, chromium, aluminum, maganese, platinum, palladium, and rhodium, oxides of said metals and mixtures of the foregoing.

2. The derivative of claim 1 prepared by the reductive amination of a hydroxyalkyl cellulose with ammonia.

3. The derivatives of claim 1 prepared by the reductive amination of a hydroxyalkyl cellulose with ammonium hydroxide.

4. The process of preparing an aminated cellulose derivative which comprises providing a hydroalkyl cellulose and reductively aminating said hydroxyalkyl cellulose with ammonia or ammonium hydroxide or an alkyl amine at 160° C. to 250° C. and under 750–4000 psig pressure in presence of hydrogen and a reducing catalyst comprising a metal selected from the group consisting of copper, nickel, cobalt, chromium, aluminum, maganese, platinum, palladium, and rhodium, oxides of said metals and mixtures of the foregoing.

5. The process of claim 4 wherein said catalyst is a nickel-based catalyst.

6. The process of claim 5 wherein said nickel-based catalyst is Raney nickel or nickel-copper-chromium catalyst.